United States Patent
Edo

(10) Patent No.: US 9,403,430 B2
(45) Date of Patent: Aug. 2, 2016

(54) INSULATOR

(71) Applicant: TOYO TIRE & RUBBER CO., LTD., Osaka-shi, Osaka (JP)

(72) Inventor: Tomoyoshi Edo, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/800,960

(22) Filed: Jul. 16, 2015

(65) Prior Publication Data

US 2016/0052384 A1 Feb. 25, 2016

(30) Foreign Application Priority Data

Aug. 19, 2014 (JP) ................. 2014-166419

(51) Int. Cl.
| | |
|---|---|
| F16M 1/00 | (2006.01) |
| B60K 13/04 | (2006.01) |
| F01N 13/18 | (2010.01) |
| F16F 1/377 | (2006.01) |
| F16F 7/108 | (2006.01) |
| F16L 55/035 | (2006.01) |
| F16L 55/033 | (2006.01) |
| F16L 3/12 | (2006.01) |

(52) U.S. Cl.
CPC ............ *B60K 13/04* (2013.01); *F01N 13/1822* (2013.01); *F16F 1/377* (2013.01); *F16F 7/108* (2013.01); *F16L 55/035* (2013.01); *F16L 55/0335* (2013.01); *F01N 2530/22* (2013.01); *F16L 3/1222* (2013.01)

(58) Field of Classification Search
CPC ... F16L 3/1222; F16L 55/0335; F16L 55/035; B60K 13/04; F01N 13/1822; F01N 2530/22; F16F 1/377; F16F 7/108

USPC .................... 248/58, 610, 613, 573
See application file for complete search history.

(56) References Cited

U.S. PATENT DOCUMENTS

| | | | |
|---|---|---|---|
| 6,264,164 B1 * | 7/2001 | Steinmaier ............. | B60K 13/04 248/610 |
| 2008/0191117 A1 * | 8/2008 | Steinmaier .......... | F01N 13/1822 248/610 |
| 2009/0020678 A1 * | 1/2009 | Miyata ................... | B60K 13/04 248/610 |
| 2009/0174126 A1 | 7/2009 | Takeshima et al. | |

FOREIGN PATENT DOCUMENTS

| | | |
|---|---|---|
| DE | 10311196 A1 | 10/2004 |
| DE | 102008021916 A1 | 11/2009 |

(Continued)

OTHER PUBLICATIONS

Search Report dated Dec. 11, 2015, issued in counterpart European Application No. 15179557.2-1606 (10 pages).

*Primary Examiner* — Christopher E Garft

(74) *Attorney, Agent, or Firm* — Westerman, Hattori, Daniels & Adrian, LLP

(57) ABSTRACT

To provide an insulator that can reduce an abnormal noise made when stopper surfaces abut and separate. A first mounting hole engaging a vehicle body side is formed in a first portion. A second mounting hole is formed in a second portion and arranged separately from the first portion. The first portion and the second portion form a first stopper surface and a second stopper surface, respectively. At least one of the first stopper surface and the second stopper surface opposite to one another is formed in a curved surface shape as a part of a cylindrical side surface. The first stopper surface and the second stopper surface can have a non-linear property when abutting and separating. Accordingly, an abnormal noise made when abutting and separating can be reduced.

6 Claims, 10 Drawing Sheets

(56) References Cited

FOREIGN PATENT DOCUMENTS

| | | |
|---|---|---|
| DE | 102009036869 A1 | 2/2011 |
| EP | 1132645 A1 | 9/2001 |
| EP | 2666988 A1 | 11/2013 |
| JP | 11-82624 A | 3/1999 |

* cited by examiner

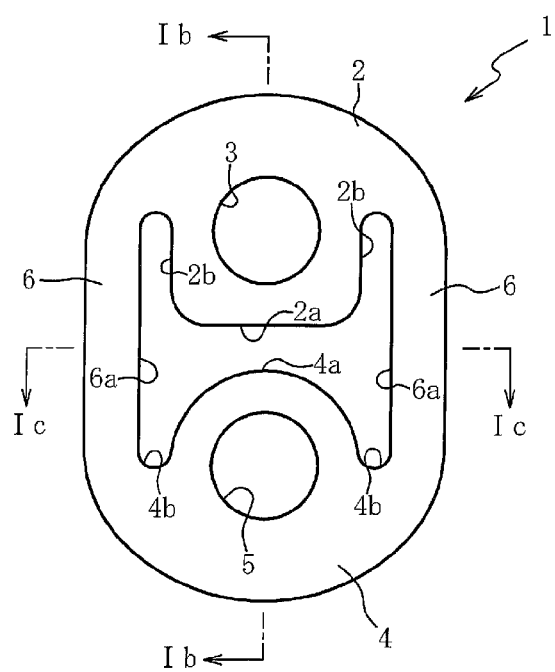
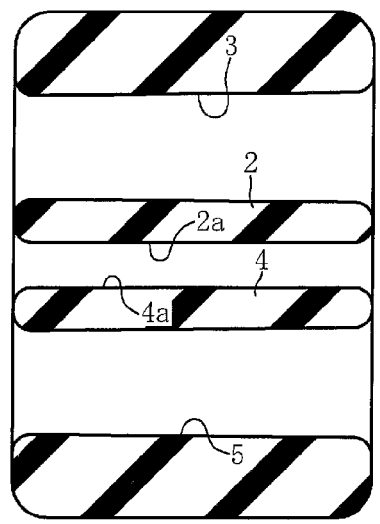
FIG. 1A  FIG. 1B
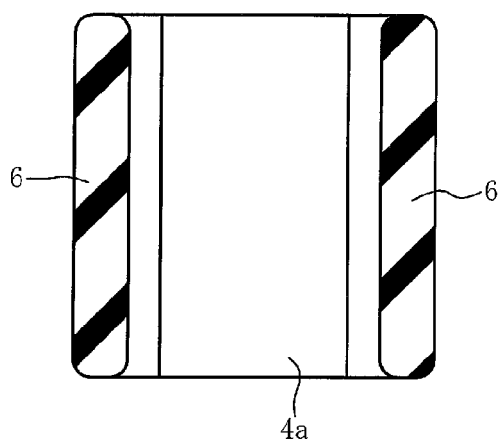
FIG. 1C

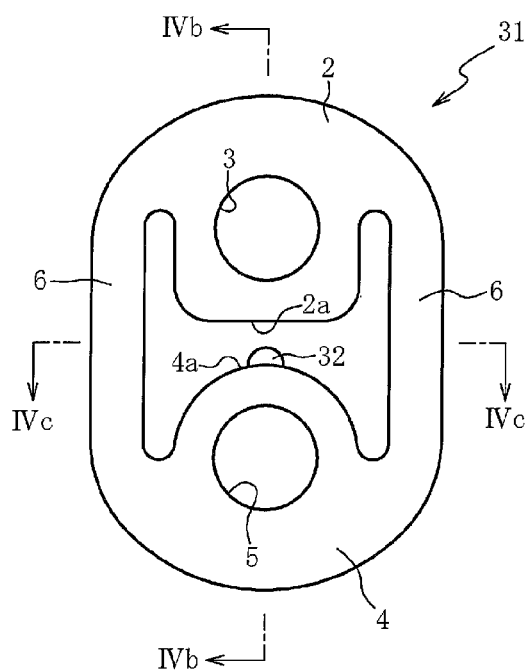
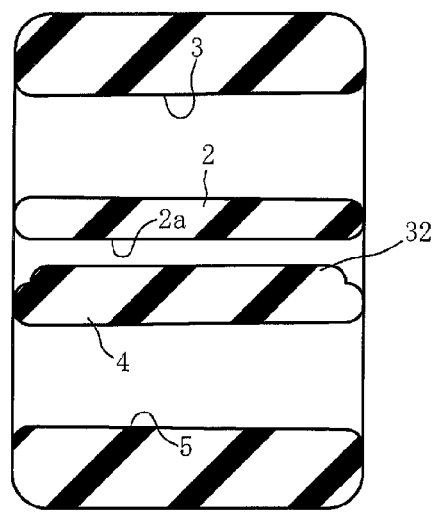
FIG. 4A  FIG. 4B
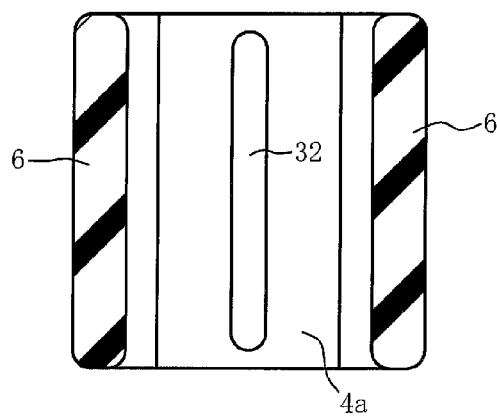
FIG. 4C

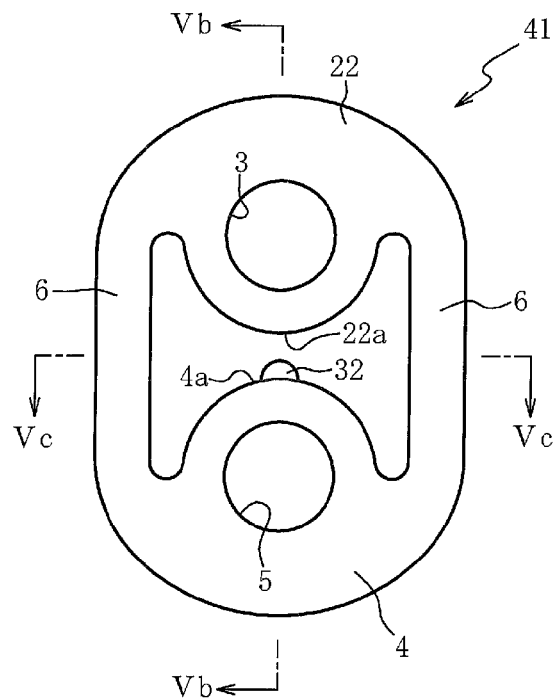
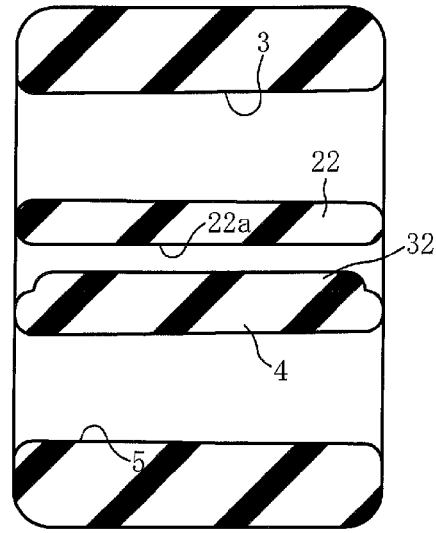
FIG. 5A  FIG. 5B
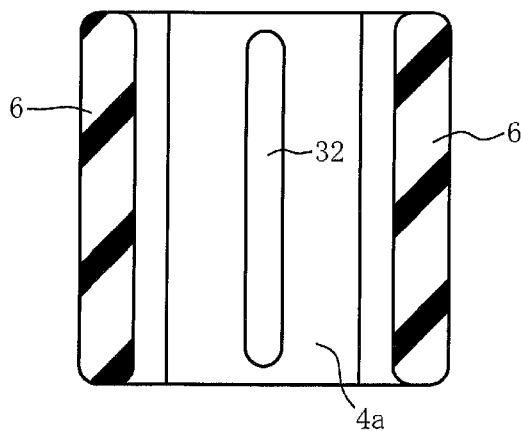
FIG. 5C

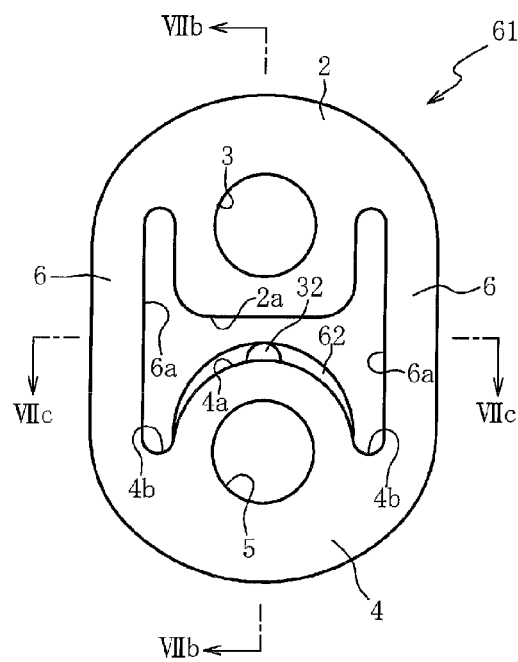
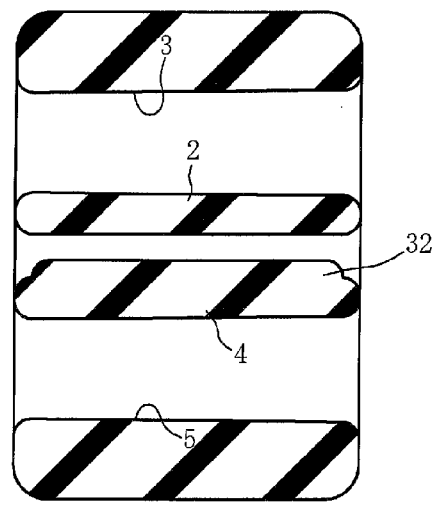
FIG. 7A　　　　　　　　　　FIG. 7B
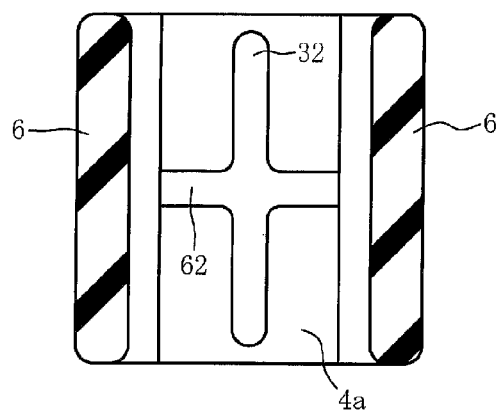
FIG. 7C

INSULATOR

TECHNICAL FIELD

The present invention relates to an insulator that is made of a rubber elastic body and elastically supports an exhaust pipe, and especially relates to the insulator that can reduce an abnormal noise.

BACKGROUND ART

A vehicle exhaust pipe is suspended on a vehicle body by an insulator made of a rubber elastic body so as to prevent vibration emitted from an engine from transmitting to the vehicle body (Patent Literature 1). In the technologies disclosed in Patent Literature 1, as the exhaust pipe moves up and down due to the vibration while the vehicle is travelling, compressive force and tensile force are applied to the insulator. The insulator forms a pair of stopper surfaces (flat surfaces) opposite to one another. Accordingly, when a large compressive force is applied, the pair of the stopper surfaces abut one another to reduce further deformation. Additionally, a plurality of protrusions are disposed on at least one of the stopper surfaces (flat surfaces). This ensures that the protrusion can be interposed between the stopper surfaces before the large compressive force is applied and accordingly the stopper surfaces (flat surfaces) are closely brought into contact. The stopper surfaces are closely brought into contact after the protrusion is crushed. This can prevent air from being contained between the stopper surfaces. Therefore, an abnormal sound (noise) made when the stopper surfaces abut can be reduced.

CITATION LIST

Patent Literature

[Patent Literature 1] JP-A No. H11-82624

SUMMARY OF INVENTION

Technical Problem

However, the above-described conventional technologies have a problem that arises in that an abnormal sound (noise) while separating is made due to quick detachment of stopper surfaces (flat surfaces) closely brought into contact from one another.

The present invention has been made to address the above-described problems, and an aim thereof is to provide an insulator that can reduce an abnormal noise made when the stopper surfaces abut and separate.

Solution to Problem and Advantageous Effects of Invention

To achieve this object, with an insulator according to claim 1, a first mounting hole engaging a vehicle body side is formed in a first portion. A second mounting hole engaging an exhaust pipe side is formed in a second portion and arranged separately from the first portion. The exhaust pipe is elastically supported by the insulator made of a rubber elastic body. Inner stopper surfaces facing one another inwardly are formed in a pair of coupling portions that connect the first portion to the second portion. The first portion and the second portion respectively form a first stopper surface and a second stopper surface with a clearance to the inner stopper surface formed in the coupling portion. At least one of the first stopper surface and the second stopper surface opposite to one another is formed in a curved surface shape as a part of a cylindrical side surface. As a result, the first stopper surface (first portion) or the second stopper surface (second portion) formed in the curved surface shape as a part of the cylindrical side surface can have a non-linear property at the time when abutting and separating. This provides an effect that allows reducing the abnormal noise made when the stopper surfaces abut and separate.

With an insulator according to claim 2, the first stopper surface or the second stopper surface formed in the curved surface shape as the part of the cylindrical side surface includes a first protrusion that has a protrusion shape and extends parallel to an axial direction of the first stopper surface or the second stopper surface. The first protrusion projects toward the facing stopper surface. This ensures the further noticeable non-linear property at the time when the first stopper surface and the second stopper surface abut and separate. This improves the effect of reducing the abnormal noise when the stopper surfaces abut or separate in addition to the effect of claim 1.

The first protrusion extends parallel to the axial direction of the first stopper surface or the second stopper surface. This provides an effect that allows obtaining the non-linear property performed by the first protrusion also in the case where the first stopper surface and the second stopper surface are relatively displaced in the axial direction.

With an insulator according to claim 3, the first stopper surface or the second stopper surface formed in the curved surface shape as the part of the cylindrical side surface includes a second protrusion that has the protrusion shape and extends perpendicular to the axial direction of the first stopper surface or the second stopper surface. The second protrusion projects toward the facing stopper surface. This ensures the further noticeable non-linear property at the time when the first stopper surface and the second stopper surface abut and separate. This improves the effect of reducing the abnormal noise when the stopper surfaces abut or separate in addition to the effect of claim 1.

The second protrusion extends perpendicular to the axial direction of the first stopper surface or the second stopper surface. This provides an effect that allows obtaining the non-linear property performed by the second protrusion also in the case where the first stopper surface and the second stopper surface are relatively displaced in a direction perpendicular to an axis.

BRIEF DESCRIPTION OF DRAWINGS

FIG. 1A is a front view of an insulator according to a first embodiment, FIG. 1B is a cross-sectional view of the insulator taken along the line Ib-Ib illustrated in FIG. 1A, and FIG. 1C is a cross-sectional view of the insulator taken along the line Ic-Ic illustrated in FIG. 1A.

FIG. 4A is a front view of the insulator according to a fourth embodiment, FIG. 4B is a cross-sectional view of the insulator taken along the line IVb-IVb illustrated in FIG. 4A, and FIG. 4C is a cross-sectional view of the insulator taken along the line IVc-IVc illustrated in FIG. 4A.

FIG. 5A is a front view of the insulator according to a fifth embodiment, FIG. 5B is a cross-sectional view of the insulator taken along the line Vb-Vb illustrated in FIG. 5A, and FIG. 5C is a cross-sectional view of the insulator taken along the line Vc-Vc illustrated in FIG. 5A.

FIG. 7A is a front view of the insulator according to a seventh embodiment, FIG. 7B is a cross-sectional view of the insulator taken along the line VIIb-VIIb illustrated in FIG. 7A, and FIG. 7C is a cross-sectional view of the insulator taken along the line VIIc-VIIc illustrated in FIG. 7A.

DESCRIPTION OF EMBODIMENTS

Figures 2A, 2B:
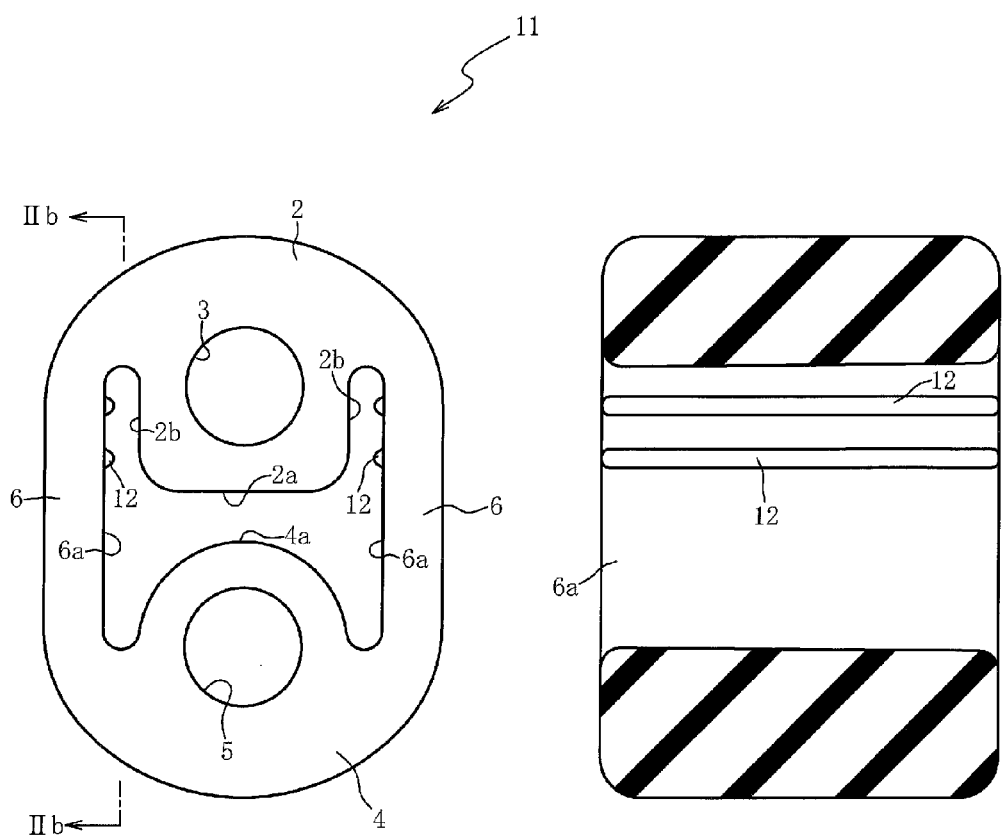
FIG. 2A is a front view of the insulator according to a second embodiment.
FIG. 2B is a cross-sectional view of the insulator taken along the line IIb-IIb illustrated in FIG. 2A.

Preferred embodiments according to the present invention will be described below by referring to the accompanying drawings. Firstly, a description will be given of an insulator 1 according to a first embodiment of the present invention with reference to FIG. 1. FIG. 1A is a front view of the insulator 1 according to the first embodiment, FIG. 1B is a cross-sectional view of the insulator 1 taken along the line Ib-Ib illustrated in FIG. 1A, and FIG. 1C is a cross-sectional view of the insulator 1 taken along the line Ic-Ic illustrated in FIG. 1A. As illustrated in FIG. 1A to FIG. 1C, the insulator 1 is a member formed in an approximately oval-like shape in a front view, and is integrally made of a rubber elastic body.

The insulator 1 includes a first portion 2 mounted on a vehicle body (not illustrated) side, a second portion 4 mounted on an exhaust pipe side (not illustrated), and a pair of coupling portions 6 that connect the first portion 2 to the second portion 4. A first mounting hole 3 having a circular shape is formed in the first portion 2. A second mounting hole 5 having a circular shape is formed in the second portion 4. A pin (not illustrated) mounted on the vehicle body is inserted into the first mounting hole 3. A pin (not illustrated) mounted on the exhaust pipe that extends from an engine (not illustrated) is inserted into the second mounting hole 5. This consequently causes the exhaust pipe to be suspended and supported by the vehicle body via the insulator 1. Here, the exhaust pipe includes a muffler connected thereto and an exhaust gas purifying device.

The first portion 2 and the second portion 4 are arranged separately from one another by the pair of the coupling portions 6 that forms inner stopper surfaces 6a facing one another inwardly. As a result, a first stopper surface 2a and a second stopper surface 4a opposite to one another are formed in the first portion 2 and the second portion 4, respectively. The first stopper surface 2a has a surface formed in a flat surface shape, and intersects orthogonally with a side surface 2b formed in the flat surface shape. The side surface 2b faces the flat surface-shaped inner stopper surface 6a formed in the coupling portion 6 with a clearance.

The second stopper surface 4a is a surface formed in a curved surface shape (semi-cylindrical shape) as a part (approximately half circumferential length) of a cylindrical side surface, and has both side edges continuous with terminal end portions 4b formed in a recessed surface shape. The second stopper surface 4a has the portion near the terminal end portion 4b (a part of cylindrical side surface) that faces the flat surface-shaped inner stopper surface 6a formed in the coupling portion 6 with a clearance.

With this insulator 1, the exhaust pipe (not illustrated) moves up and down in conjunction with an engine vibration and a vehicle travelling, which causes the first portion 2, the second portion 4, and the coupling portion 6 to expand and contract in a vertical direction so as to absorb the vibrations. Applying a large vertical compressive force to the insulator 1 causes the first stopper surface 2a and the second stopper surface 4a to abut one another. Accordingly, excessive deformation of the insulator 1 decreases. The second stopper surface 4a is formed in the curved surface shape as the part of the cylindrical side surface. This ensures that the first portion 2 and the second portion 4 can have a non-linear property when the first stopper surface 2a and the second stopper surface 4a abut one another.

That is, the deformation of the first stopper surface 2a and the second stopper surface 4a gradually increases an area contacting the first stopper surface 2a along a circumferential direction of the second stopper surface 4a (cylindrical side surface). A contact region spreads from a center of the second stopper surface 4a along the circumferential direction of the cylindrical side surface. This can prevent air from being contained between the first stopper surface 2a and the second stopper surface 4a. As a result, an abnormal sound (noise) that is made when abutting can be reduced.

The first portion 2 and the second portion 4 can have the non-linear property, also when the first stopper surface 2a and the second stopper surface 4a which are closely brought into contact separate from one another. That is, the deformation of the first stopper surface 2a and the second stopper surface 4a gradually decreases the area contacting the first stopper surface 2a along the circumferential direction of the second stopper surface 4a (cylindrical side surface). The contact region becomes narrower from both sides of the second stopper surface 4a along the circumferential direction of the cylindrical side surface. This ensures the reduced abnormal noise made when separating in comparison with the case of quick separation of both flat surfaces closely brought into contact from one another.

Additionally, the second stopper surface 4a is formed in the curved surface shape as the part of the cylindrical side surface. This ensures the reduced stress at the time when the first stopper surface 2a and the second stopper surface 4a abut one another (at the time of compression deformation) in comparison with a protrusion on which the part of the flat surface is raised (Patent Literature 1). This can prevent fatigue (plastic flow, so-called permanent set) from occurring in comparison with the protrusion on which the stress is concentrated. The reduction effect of the abnormal noise can be ensured over a long period of time.

Furthermore, the first stopper surface 2a abutting on the second stopper surface 4a is formed in the flat surface shape, which causes the first stopper surface 2a (planar surface) and the second stopper surface 4a (curved surface) to abut one another. The stress can be reduced in comparison with the case where both curved surfaces abut one another. This can prevent the first portion 2 and the second portion 4 from becoming fatigued. Therefore, durability of the insulator 1 can be ensured.

As the exhaust pipe rolls with respect to the vehicle body, the coupling portion 6 bends. Consequently, the first portion 2 and the second portion 4 are relatively displaced in a lateral direction (the right-left direction in FIG. 1A). This relative displacement causes: the side surface 2b and the inner stopper surface 6a; and the second stopper surface 4a and the inner stopper surface 6a to abut one another. Accordingly, the excessive deformation of the coupling portion 6 decreases. At this time, the second stopper surface 4a is formed in the curved surface shape as the part of the cylindrical side surface. This ensures that the second portion 4 and the coupling portion 6 can have the non-linear property when the second stopper surface 4a and the inner stopper surface 6a abut one another.

That is, when the inner stopper surface 6a and the second stopper surface 4a abut one another, the area contacting the inner stopper surface 6a along the circumferential direction of the second stopper surface 4a (cylindrical side surface) gradually increases. The contact region spreads along the circumferential direction of the cylindrical side surface of the second stopper surface 4a. This can prevent air from being contained between the inner stopper surface 6a and the second stopper surface 4a. As a result, the abnormal noise made when abutting can be reduced.

The second portion 4 and the coupling portion 6 may have the non-linear property, also when the inner stopper surface 6a and the second stopper surface 4a which are closely brought into contact separate from one another. That is, when separating, the area contacting the inner stopper surface 6a along the circumferential direction of the second stopper surface 4a (cylindrical side surface) gradually decreases. Unlike the case of the quick separation of both flat surfaces closely brought into contact from one another, the contact region becomes narrower along the circumferential direction of the cylindrical side surface of the second stopper surface 4a. This ensures that the abnormal noise made when separating can be reduced.

The second stopper surface 4a, which is formed in the curved surface shape as the part of the cylindrical side surface, has both side edges continuous with the terminal end portions 4b formed in the recessed surface shape. Accordingly, the terminal end portion 4b can have a smaller curvature than that of the terminal end portion where the side surface 2b of the first portion 2 and the inner stopper surface 6a are continuous. As a result, the stress applied to the terminal end portion 4b can be further reduced (dispersed) than that of the terminal end portion of the first portion 2. Therefore, a crack caused by external force applied to the insulator 1 can be made hard to occur in the terminal end portion 4b. As a result, this can increase durability of the insulator 1.

Next, a description will be given of a second embodiment with reference to FIG. 2. In the second embodiment, the case where a projection 12 is formed on the inner stopper surface 6a will be described. Here, like reference numerals designate corresponding or identical elements in the first embodiment and the second embodiment, and therefore such elements will not be further elaborated or simplified here. FIG. 2A is a front view of an insulator 11 according to the second embodiment, and FIG. 2B is a cross-sectional view of the insulator 11 taken along the line IIb-IIb illustrated in FIG. 2A.

As illustrated in FIG. 2A, the insulator 11 forms the plurality of projections 12 on a part of the inner stopper surface 6a facing the side surface 2b of the first portion 2. The projection 12 is a portion that projects toward the side surface 2b of the first portion 2. As illustrated in FIG. 2B, the projection 12 is disposed over the entire length of the inner stopper surface 6a parallel to an axial direction (the right-left direction in FIG. 2B) of the second stopper surface 4a (a part of cylindrical side surface).

As the exhaust pipe (not illustrated) elastically supported by the vehicle body (not illustrated) employing the insulator 11 rolls, the coupling portion 6 bends. Consequently, the first portion 2 and the second portion 4 are relatively displaced in the lateral direction (the right-left direction in FIG. 2A). This relative displacement causes: the side surface 2b and the inner stopper surface 6a; and the second stopper surface 4a and the inner stopper surface 6a to abut one another. Accordingly, the excessive deformation of the coupling portion 6 decreases. At this time, the projection 12 is disposed on the inner stopper surface 6a. This ensures that the projection 12 can be interposed before the side surface 2b and the inner stopper surface 6a are closely brought into contact. The side surface 2b and the inner stopper surface 6a are closely brought into contact after the projection 12 is crushed. This can prevent air from being contained between the side surface 2b and the inner stopper surface 6a (between flat surfaces). Therefore, the abnormal noise made when the side surface 2b and the inner stopper surface 6a abut one another can be reduced.

Furthermore, as a force in a rotation (yaw) direction around an axis of a vertical (top and bottom in FIG. 2A) is applied to the insulator 11, the coupling portion 6 is twisted around the axis of the vertical. The projection 12 is disposed over the entire length of the inner stopper surface 6a. This ensures that the projection 12 can be interposed before the side surface 2b and the inner stopper surface 6a are closely brought into contact. Therefore, the abnormal noise made when the side surface 2b and the inner stopper surface 6a abut one another can be reduced, also in the case where the coupling portion 6 is twisted due to a yawing.

The description has been given of the case where the projection 12 is disposed on the inner stopper surface 6a of the coupling portion 6. However, it is not limited to the above, and it is obviously possible for a projection to be disposed on the side surface 2b of the first portion 2. This also provides similar advantageous effects to those in the above-described embodiment.

Figure 3A:
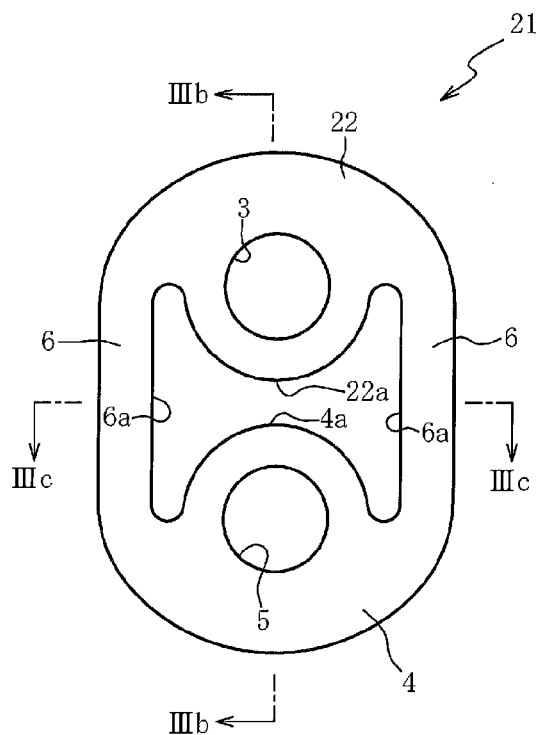
FIG. 3A is a front view of the insulator according to a third embodiment.
Figure 3B:
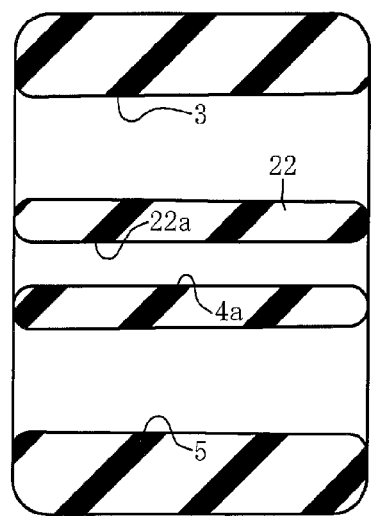
FIG. 3B is a cross-sectional view of the insulator taken along the line IIIb-IIIb illustrated in FIG. 3A.
Figure 3C:
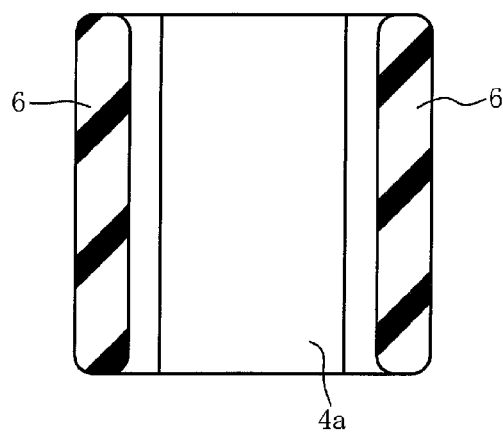
FIG. 3C is a cross-sectional view of the insulator taken along the line IIIc-IIIc illustrated in FIG. 3A.

Next, a description will be given of a third embodiment with reference to FIG. 3. In the first embodiment and the second embodiment, the description has been given of the case where the first stopper surface 2a formed in the first portion 2 is formed in the flat surface shape. In contrast, in the third embodiment, a description will be given of the case where a first stopper surface 22a formed in a first portion 22 is formed in the curved surface shape as the part of the cylindrical side surface. Here, like reference numerals designate corresponding or identical elements in the first embodiment and the third embodiment, and therefore such elements will not be further elaborated or simplified here. FIG. 3A is a front view of an insulator 21 according to the third embodiment, FIG. 3B is a cross-sectional view of the insulator 21 taken along the line IIIb-IIIb illustrated in FIG. 3A, and FIG. 3C is a cross-sectional view of the insulator 21 taken along the line IIIc-IIIc illustrated in FIG. 3A.

Applying a large vertical compressive force to the insulator 21 causes the first stopper surface 22a and the second stopper surface 4a to abut one another. Accordingly, excessive deformation of the insulator 21 decreases. The first stopper surface 22a and the second stopper surface 4a are both formed in the curved surface shape (semi-cylindrical shape) as the part (approximately half circumferential length) of the cylindrical side surface. This ensures that the first portion 22 and the second portion 4 can have the non-linear property when the first stopper surface 22a and the second stopper surface 4a abut one another.

That is, the deformation of the first stopper surface 22a and the second stopper surface 4a gradually increases the area closely brought into contact to one another along the circumferential direction of the first stopper surface 22a and the second stopper surface 4a (cylindrical side surface). The contact region spreads from the center of the first stopper surface 22a and the second stopper surface 4a along the circumferential direction of the cylindrical side surface. This can prevent air from being contained between the first stopper surface 22a and the second stopper surface 4a. The first stopper surface 22a and the second stopper surface 4a are both formed in the curved surface shape as the part of the cylindrical side surface. This improves the effect of preventing air from being contained in comparison with the case where one stopper surface is formed in the flat surface shape. As a result, the reduction effect of the abnormal noise made when abutting can be improved.

Furthermore, when the first stopper surface 22a and the second stopper surface 4a which are closely brought into contact separate from one another, the deformation of the first stopper surface 22a and the second stopper surface 4a gradually decreases the area closely brought into contact to one another along the circumferential direction of the first stopper surface 22a and the second stopper surface 4a (cylindrical side surface). The contact region becomes narrower from both sides of the first stopper surface 22a and the second stopper surface 4a along the circumferential direction of the cylindrical side surface. This can improve the reduction effect of the abnormal noise made when separating in comparison with the case where one stopper surface is formed in the flat surface shape.

Additionally, the first stopper surface 22a is formed in the curved surface shape as the part of the cylindrical side surface. This ensures that the abnormal noise made when the inner stopper surface 6a (flat surface) and the first stopper surface 22a (a part of cylindrical side surface) abut and separate from one another can be reduced.

Next, a description will be given of a fourth embodiment with reference to FIG. 4. In the fourth embodiment, the case where a protrusion (first protrusion 32) is formed on the second stopper surface 4a of the insulator 1 (see FIG. 1) as described in the first embodiment will be described. Here, like reference numerals designate corresponding or identical elements in the first embodiment and the fourth embodiment, and therefore such elements will not be further elaborated or simplified here. FIG. 4A is a front view of an insulator 31 according to the fourth embodiment, FIG. 4B is a cross-sectional view of the insulator 31 taken along the line IVb-IVb illustrated in FIG. 4A, and FIG. 4C is a cross-sectional view of the insulator 31 taken along the line IVc-IVc illustrated in FIG. 4A.

As illustrated in FIG. 4A, the insulator 31 includes the first protrusion 32 disposed on the part (top portion) of the second stopper surface 4a closest to the first stopper surface 2a. The first protrusion 32 has a cross-sectional shape formed in a semi-cylindrical shape having a larger curvature than that of the second stopper surface 4a. The first protrusion 32, which extends parallel to the axial direction (the right-left direction in FIG. 4B) of the second stopper surface 4a (cylindrical side surface), is formed in a protrusion shape that projects toward the facing first stopper surface 2a. The first protrusion 32 is disposed approximately over the entire length of the second stopper surface 4a.

Applying a large vertical compressive force to the insulator 31 causes the first protrusion 32 first to abut on the first stopper surface 2a. The first stopper surface 22a and the second stopper surface 4a are closely brought into contact after the first protrusion 32 is crushed. The first protrusion 32 has the larger curvature than that of the second stopper surface 4a. This can prevent air from being contained between the first stopper surface 2a and the first protrusion 32 in comparison with the case where the first stopper surface 2a and the second stopper surface 4a abut one another. This improves the effect of reducing the abnormal sound (noise) made when the first stopper surface 2a and the second stopper surface 4a abut one another.

Furthermore, as a force in a rotation (pitch) direction around an axis of a horizon (right and left in FIG. 4A) is applied to the insulator 31, the coupling portion 6 is twisted around the axis of the horizon. The first protrusion 32 is disposed approximately over the entire length of the second stopper surface 4a. This ensures that the first protrusion 32 can be interposed before the first stopper surface 2a and the second stopper surface 4a are closely brought into contact. This improves the effect of reducing the abnormal noise made when the first stopper surface 2a and the second stopper surface 4a abut one another, also in the case where the coupling portion 6 is twisted due to a pitching.

Next, a description will be given of a fifth embodiment with reference to FIG. 5. In the fifth embodiment, the case where the protrusion (first protrusion 32) is formed on the second stopper surface 4a of the insulator 21 (see FIG. 3) as described in the third embodiment will be described. Here, like reference numerals designate corresponding or identical elements in the third embodiment, the fourth embodiment, and the fifth embodiment, and therefore such elements will not be further elaborated or simplified here. FIG. 5A is a front view of an insulator 41 according to the fifth embodiment, FIG. 5B is a cross-sectional view of the insulator 41 taken along the line Vb-Vb illustrated in FIG. 5A, and FIG. 5C is a cross-sectional view of the insulator 41 taken along the line Vc-Vc illustrated in FIG. 5A.

As illustrated in FIG. 5A to FIG. 5C, the insulator 41 includes the first protrusion 32 disposed on the part (top portion) of the second stopper surface 4a closest to the first stopper surface 22a. This provides similar advantageous effects to those of the insulator 31 as described in the fourth embodiment.

Figures 6A, 6B:
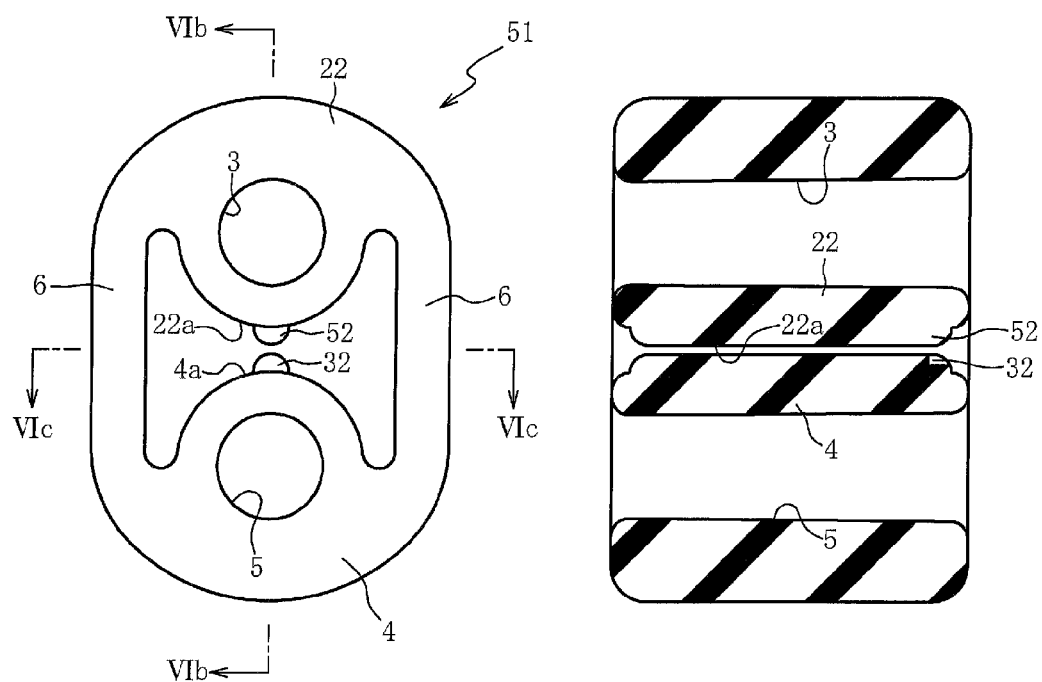
FIG. 6A is a front view of the insulator according to a sixth embodiment.
FIG. 6B is a cross-sectional view of the insulator taken along the line VIb-VIb illustrated in FIG. 6A.
Figure 6C:
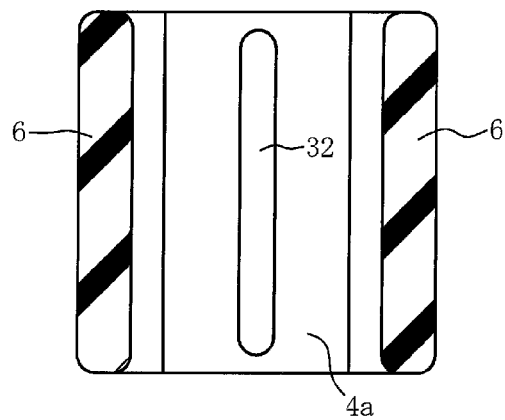
FIG. 6C is a cross-sectional view of the insulator taken along the line VIc-VIc illustrated in FIG. 6A.

Next, a description will be given of a sixth embodiment with reference to FIG. 6. In the sixth embodiment, the case where a protrusion (first protrusion 52) is formed on the first stopper surface 22a of the insulator 41 (see FIG. 5) as described in the fifth embodiment will be described. Here, like reference numerals designate corresponding or identical elements in the fifth embodiment and the sixth embodiment, and therefore such elements will not be further elaborated or simplified here. FIG. 6A is a front view of an insulator 51 according to the sixth embodiment, FIG. 6B is a cross-sectional view of the insulator 51 taken along the line VIb-VIb illustrated in FIG. 6A, and FIG. 6C is a cross-sectional view of the insulator 51 taken along the line VIc-VIc illustrated in FIG. 6A.

As illustrated in FIG. 6A, the insulator 51 includes the first protrusion 52 disposed on the part (lower portion) of the first stopper surface 22a closest to the second stopper surface 4a. The first protrusion 52 has a cross-sectional shape formed in a semi-cylindrical shape having a larger curvature than that of the first stopper surface 22a. The first protrusion 52, which extends parallel to the axial direction (the right-left direction in FIG. 6B) of the first stopper surface 22a (cylindrical side surface), is formed in the protrusion shape that projects toward the facing second stopper surface 4a. The first protrusion 52, which faces the first protrusion 32 disposed on the second stopper surface 4a, is disposed approximately over the entire length of the first stopper surface 22a.

Applying a large vertical compressive force to the insulator 51 causes both first protrusions 32 and 52 first to abut one another. The first stopper surface 22a and the second stopper surface 4a are closely brought into contact after the first protrusions 32 and 52 are crushed. The first protrusion 52 has the larger curvature than that of the first stopper surface 22a. This can prevent air from being contained between the first protrusions 32 and 52 in comparison with the case where the first stopper surface 2a and the first protrusion 32 abut one another. This improves the effect of reducing the abnormal noise made when the first stopper surface 22a and the second stopper surface 4a abut one another.

Next, a description will be given of a seventh embodiment with reference to FIG. 7. In the seventh embodiment, the case where a protrusion (second protrusion 62) is formed on the second stopper surface 4a of the insulator 31 (see FIG. 4) as described in the fourth embodiment will be described. Here, like reference numerals designate corresponding or identical elements in the fourth embodiment and the seventh embodiment, and therefore such elements will not be further elaborated or simplified here. FIG. 7A is a front view of an insulator 61 according to the seventh embodiment, FIG. 7B is a cross-sectional view of the insulator 61 taken along the line VIIb-VIIb illustrated in FIG. 7A, and FIG. 7C is a cross-sectional view of the insulator 61 taken along the line VIIc-VIIc illustrated in FIG. 7A.

As illustrated in FIG. 7A, the insulator 61 includes the second protrusion 62, which intersects with the first protrusion 32 disposed on the second stopper surface 4a, disposed on the second stopper surface 4a. As illustrated in FIG. 7A and FIG. 7B, a projection height of the second protrusion 62 from the second stopper surface 4a of the portion intersecting with the first protrusion 32 is configured identical to the projection height of the first protrusion 32. As illustrated in FIG. 7C, the second protrusion 62, which extends perpendicular to the axial direction (vertical direction in FIG. 7C) of the second stopper surface 4a (cylindrical side surface), is formed in the protrusion shape that projects toward the facing first stopper surface 2a. The second protrusion 62 is arranged in the center in the axial direction of the second stopper surface 4a, and disposed approximately over the entire length of the circumferential direction of the second stopper surface 4a. The projection height of the second protrusion 62 from the second stopper surface 4a of both end portions of the circumferential direction gradually decreases toward the terminal end portion 4b. The projection height of an end portion of the circumferential direction is set to "0".

Operation of the insulator 61 performed when the large vertical compressive force being applied is similar to those of the insulator 31 according to the fourth embodiment, and therefore will not be further described. With this the insulator 61, similar advantageous effects to those of the insulator 31 according to the fourth embodiment can be provided.

Furthermore, as a force in a rotation (roll) direction around an axis in front and rear (vertical with respect to paper surface in FIG. 7A) is applied to the insulator 61, the coupling portion 6 is twisted around the axis in front and rear. The second protrusion 62 is disposed approximately over the entire length of the circumferential direction of the second stopper surface 4a. This ensures that the second protrusion 62 can be interposed before the first stopper surface 2a and the second stopper surface 4a are closely brought into contact. This improves the effect of reducing the abnormal noise made when the first stopper surface 2a and the second stopper surface 4a abut one another, also in the case where the coupling portion 6 is twisted due to a rolling.

The projection height of the second protrusion 62 from the second stopper surface 4a of both end portions of the circumferential direction gradually decreases toward the terminal end portion 4b. The projection height of the end portion of the circumferential direction is set to "0". As a result, when the exhaust pipe rolls with respect to the vehicle body and causes the second stopper surface 4a and the inner stopper surface 6a to abut one another, a load can be prevented from being applied to the second protrusion 62 (especially end portion of the circumferential direction). This can prevent the second protrusion 62 from being subjected to a plastic flow (fatigue), and accordingly can prolong the life of the second protrusion 62.

Figures 8A, 8B:
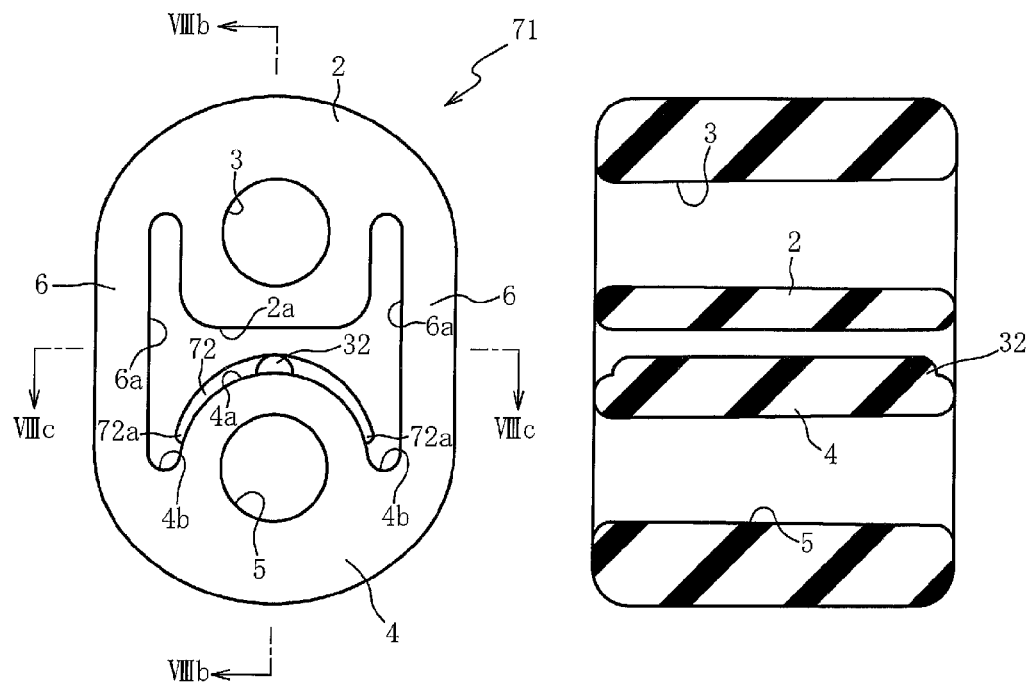
FIG. 8A is a front view of the insulator according to an eighth embodiment.
FIG. 8B is a cross-sectional view of the insulator taken along the line VIIIb-VIIIb illustrated in FIG. 8A.
Figure 8C:
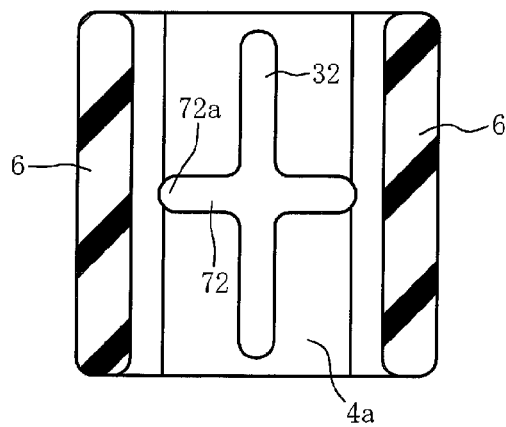
FIG. 8C is a cross-sectional view of the insulator taken along the line VIIIc-VIIIc illustrated in FIG. 8A.

Next, a description will be given of an eighth embodiment with reference to FIG. 8. In the eighth embodiment, the case where a second protrusion 72 is formed, instead of the second protrusion 62 formed on the second stopper surface 4a of the insulator 61 (see FIG. 7) as described in the seventh embodiment, will be described. Here, like reference numerals designate corresponding or identical elements in the fourth embodiment and the eighth embodiment, and therefore such elements will not be further elaborated or simplified here. FIG. 8A is a front view of an insulator 71 according to the eighth embodiment, FIG. 8B is a cross-sectional view of the insulator 71 taken along the line VIIIb-VIIIb illustrated in FIG. 8A, and FIG. 8C is a cross-sectional view of the insulator 71 taken along the line VIIIc-VIIIc illustrated in FIG. 8A.

As illustrated in FIG. 8A, the insulator 71 includes the second protrusion 72, which intersects with the first protrusion 32 disposed on the second stopper surface 4a, disposed on the second stopper surface 4a. As illustrated in FIG. 8A and FIG. 8B, a projection height of the second protrusion 72 from the second stopper surface 4a of the portion intersecting with the first protrusion 32 is configured identical to the projection height of the first protrusion 32. As illustrated in FIG. 8C, the second protrusion 72, which extends perpendicular to the axial direction (vertical direction in FIG. 8C) of the second stopper surface 4a (cylindrical side surface), is formed in the protrusion shape that projects toward the facing first stopper surface 2a. The second protrusion 72 is arranged in the center in the axial direction of the second stopper surface 4a, and disposed approximately over the entire length of the circumferential direction of the second stopper surface 4a. The second protrusion 72 includes an end portion 72a of both sides of the circumferential direction which projects from the second stopper surface 4a toward the inner stopper surface 6a.

The operations of the insulator 71 performed when the large vertical compressive force and the force in the rotation (roll) direction being applied are similar to those of the insulator 61 according to the seventh embodiment, and therefore will not be further described. With this the insulator 71, similar advantageous effects to those of the insulator 61 according to the seventh embodiment can be provided.

The second protrusion 72 includes the end portion 72a of both sides of the circumferential direction that projects from the second stopper surface 4a toward the inner stopper surface 6a. As a result, when the exhaust pipe rolls with respect to the vehicle body and causes the second stopper surface 4a and the inner stopper surface 6a to abut one another, the end portion 72a can be interposed before the second stopper surface 4a and the inner stopper surface 6a are closely brought into contact. The second stopper surface 4a and the inner stopper surface 6a are closely brought into contact after the end portion 72a is crushed. This can prevent air from being contained between the second stopper surface 4a (cylindrical side surface) and the inner stopper surface 6a (between flat surfaces). This improves the effect of reducing the abnormal noise made when the second stopper surface 4a and the inner stopper surface 6a abut one another.

Figures 9A, 9B:
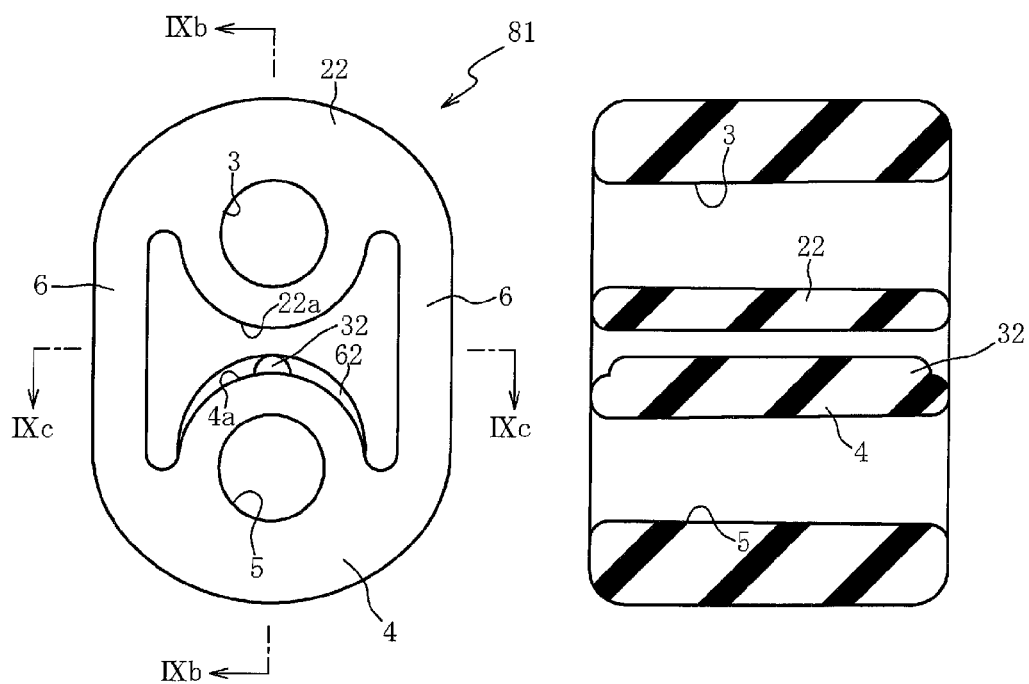
FIG. 9A is a front view of the insulator according to a ninth embodiment.
FIG. 9B is a cross-sectional view of the insulator taken along the line IXb-IXb illustrated in FIG. 9A.

Next, a description will be given of a ninth embodiment with reference to FIG. 9. In the ninth embodiment, the case where the protrusion (second protrusion 62) is formed on the second stopper surface 4a of the insulator 41 (see FIG. 5) as described in the fifth embodiment will be described. Here, like reference numerals designate corresponding or identical elements in the fifth embodiment, the seventh embodiment, and the ninth embodiment, and therefore such elements will not be further elaborated or simplified here. FIG. 9A is a front view of an insulator 81 according to the ninth embodiment, FIG. 9B is a cross-sectional view of the insulator 81 taken along the line IXb-IXb illustrated in FIG. 9A, and FIG. 9C is a cross-sectional view of the insulator 81 taken along the line IXc-IXc illustrated in FIG. 9A.

Figure 9C:
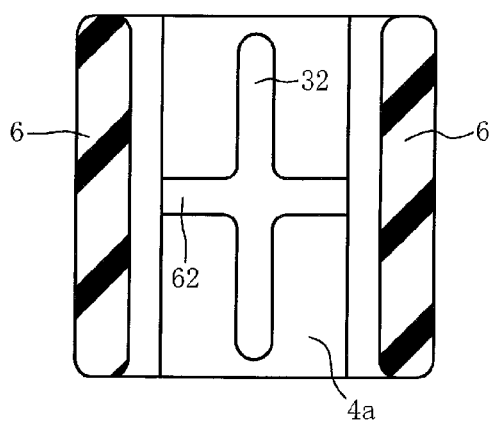
FIG. 9C is a cross-sectional view of the insulator taken along the line IXc-IXc illustrated in FIG. 9A.

As illustrated in FIG. 9A to FIG. 9C, the insulator 81 includes the second protrusion 62, which intersects with the first protrusion 32 disposed on the second stopper surface 4a, disposed on the second stopper surface 4a. This provides similar advantageous effects to those of the insulator 61 as described in the seventh embodiment.

Figures 10A, 10B:
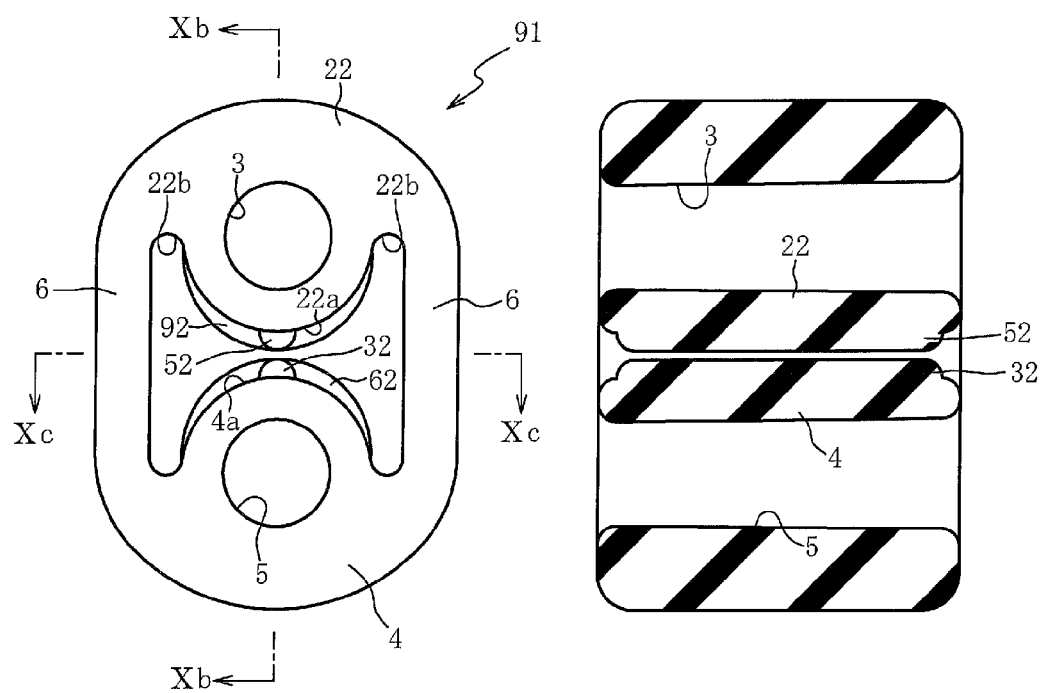
FIG. 10A is a front view of the insulator according to a tenth embodiment.
FIG. 10B is a cross-sectional view of the insulator taken along the line Xb-Xb illustrated in FIG. 10A.
Figure 10C:
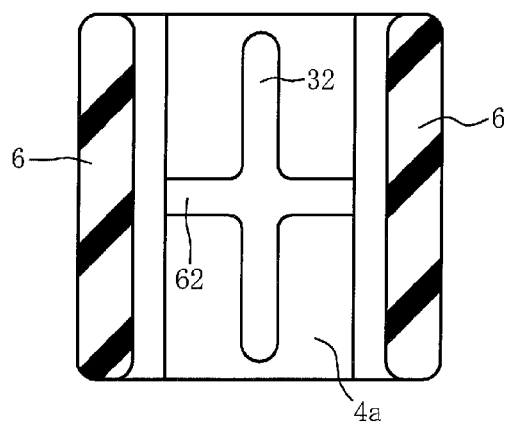
FIG. 10C is a cross-sectional view of the insulator taken along the line Xc-Xc illustrated in FIG. 10A.

Next, a description will be given of a tenth embodiment with reference to FIG. 10. In the tenth embodiment, the case where the protrusions (first protrusion 52 and second protrusion 92) are formed on the first stopper surface 22a of the insulator 81 (see FIG. 9) as described in the ninth embodiment will be described. Here, like reference numerals designate corresponding or identical elements in the sixth embodiment, the seventh embodiment, and the tenth embodiment, and therefore such elements will not be further elaborated or simplified here. FIG. 10A is a front view of an insulator 91 according to the tenth embodiment, FIG. 10B is a cross-sectional view of the insulator 91 taken along the line Xb-Xb illustrated in FIG. 10A, and FIG. 10C is a cross-sectional view of the insulator 91 taken along the line Xc-Xc illustrated in FIG. 10A.

As illustrated in FIG. 10A, the insulator 91 includes the first protrusion 52 disposed on the part of the first stopper surface 22a closest to the second stopper surface 4a. The first protrusion 52 has the cross-sectional shape formed in the semi-cylindrical shape having the larger curvature than that of the first stopper surface 22a. The first protrusion 52, which extends parallel to the axial direction (the right-left direction in FIG. 10B) of the first stopper surface 22a (cylindrical side surface), is formed in the protrusion shape that projects toward the facing second stopper surface 4a. The first protrusion 52, which faces the first protrusion 32 disposed on the second stopper surface 4a, is disposed approximately over the entire length of the first stopper surface 22a.

Furthermore, the insulator 91 includes the second protrusion 92, which intersects with the first protrusion 52, disposed on the first stopper surface 22a. As illustrated in FIG. 10A and FIG. 10B, a projection height of the second protrusion 92 from the first stopper surface 22a of the portion intersecting with the first protrusion 52 is configured identical to the projection height of the first protrusion 52. The second protrusion 92, which extends perpendicular to the axial direction (vertical direction with respect to paper surface in FIG. 10A) of the first stopper surface 22a (cylindrical side surface), is formed in the protrusion shape that projects toward the facing second stopper surface 4a. The second protrusion 92 is arranged in the center in the axial direction of the first stopper surface 22a. The second protrusion 92, which faces the second protrusion 62 disposed on the second stopper surface 4a, is disposed approximately over the entire length of the circumferential direction of the first stopper surface 22a. The projection height of the second protrusion 92 from the first stopper surface 22a of both end portions of the circumferential direction gradually decreases toward a terminal end portion 22b. The projection height of the end portion of the circumferential direction is set to "0".

As a large compressive force in the roll direction is applied to the insulator 91, the coupling portion 6 is twisted around the axis in front and rear (vertical with respect to paper surface in FIG. 10A). The second protrusions 62 and 92 are disposed approximately over the entire length of the circumferential direction of the first stopper surface 22a and the second stopper surface 4a, respectively. This ensures that the second protrusions 62 and 92 can be interposed before the first stopper surface 22a and the second stopper surface 4a are closely brought into contact. This improves the effect of reducing the abnormal noise made when the first stopper surface 22a and the second stopper surface 4a abut one another, also in the case where the coupling portion 6 is twisted due to the rolling.

As described above, the present invention has been described based on the above-mentioned embodiments. It will be appreciated that the present invention will not be limited to the embodiments described above, but various modifications are possible without departing from the technical scope of the present invention. For example, the shapes of the whole and each portion of the insulators 1, 11, 21, 31, 41, 51, 61, 71, 81, and 91, and such as shape and quantity of the projection 12 may be configured appropriately.

In the above-described respective embodiments, the description has been given of the cases where the whole shape of the insulators 1, 11, 21, 31, 41, 51, 61, 71, 81, and 91 is formed in the approximately oval-like shape in the front view. This, however, should not be construed in a limiting sense. It is obviously possible to form the whole shape of the insulators in a well-known shape such as an approximately circular shape, a cornered rectangular shape, an approximately semi-circular shape in the front view.

In the above-described respective embodiments, the description has been given of the cases where one of the circular-shaped first mounting hole 3 and the second mounting hole 5 are formed in each of the first portions 2 and 22, and the second portion 4, respectively. This, however, should not be construed in a limiting sense. It is obviously possible for the shape and the quantity of the first mounting hole 3 and the second mounting hole 5 to be configured appropriately corresponding to the shape and the quantity of a bracket and a pin mounted in the vehicle body and the exhaust pipe.

In the above-described respective embodiments, the description has been given of the cases where the pair of the coupling portions 6 is formed in a tabular shape so as to linearly extend in the vertical direction. However, it is not limited to the above, and it is obviously possible for the coupling portion 6 to be formed in a curved plate shape.

In the above-described embodiments, the description has been given of the cases where the second stopper surface 4a of the second portion 4 is always formed in the curved surface shape as the part of the cylindrical side surface. This, however, should not be construed in a limiting sense. It is obviously possible to form the first stopper surface 22a of the first portion 22 in the curved surface shape as the part of the cylindrical side surface, and to form the second stopper surface of the second portion in the various shapes such as flat surface. Also, in this case the first stopper surface 22a of the first portion 22 is formed in the curved surface shape as the part of the cylindrical side surface, and accordingly it is possible to prevent the abnormal noise made when the first stopper surface and the second stopper surface abut and separate from one another while the large vertical compressive force is applied to the insulator.

In the above-described embodiments, the description has been given of the cases where the first protrusions 32 and 52 intersecting with the second protrusions 62, 72, and 92 are always disposed when disposing the second protrusions 62, 72, and 92. This, however, should not be construed in a limiting sense. It is obviously possible for the second protrusions 62, 72, and 92 without the first protrusions 32 and 52 to be disposed. Disposing the second protrusions 62, 72, and 92 improves the effect of reducing the abnormal noise when the large compressive force in the roll direction is applied to the insulator.

In the second embodiment, the description has been given of the cases where the projection 12 is disposed on the inner stopper surface 6a that faces the side surface 2b of the first portion 2 formed in the flat surface shape. This, however, should not be construed in a limiting sense. It is obviously possible for the projection 12 to be disposed on the inner stopper surface 6a that faces the second stopper surface 4a formed in the curved surface shape as the part of the cylindrical side surface. The projection 12 can improve the effect of reducing the abnormal noise made when the second stopper surface 4a (cylindrical side surface) and the inner stopper surface 6a abut one another.

In the above-described embodiments, while the description is omitted, the insulators 1, 11, 21, 31, 41, 51, 61, 71, 81, and 91 may be produced by different material molding (Method of integrating a plurality of kinds of materials by adhesion in a forming process). For example, the first stopper surfaces 2a and 22a (first portions 2, 22) and the second stopper surface 4a (second portion 4) are made of different material. This enhances the effect of reducing the abnormal noise made when the first stopper surfaces 2a and 22a abut on the second stopper surface 4a.

Furthermore, the first protrusions 32 and 52 or the second protrusions 62, 72, and 92 may be formed in a self-lubricating rubber of the different material from the first portions 2 and 22 or the second portion 4 by the different material molding. The self-lubricating rubber is the rubber elastic body having the surface with self-lubrication property. For example, the one which a lubricant such as fatty acid amide bleeds on the surface of the rubber elastic body to reduce friction coefficient of the surface so as to show lubricity, is employed. Since the first protrusions 32 and 52 or the second protrusions 62, 72, and 92 have the surface with the self-lubrication property, the abnormal noise caused by the first protrusions 32 and 52 or the second protrusions 62, 72, and 92 rubbing against the counter members (stopper surface or protrusion) can be reduced.

Additionally, the first portions 2 and 22 or the second portion 4 are constituted of the rubber elastic body that has the surface with the self-lubrication property. This can reduce the friction coefficient of the first stopper surfaces 2a and 22a or the second stopper surface 4a and exhibit the lubricity. As a result, the abnormal noise caused by the rubbing when the first stopper surfaces 2a and 22a abut on the second stopper surface 4a can be reduced.

The invention claimed is:

1. An insulator that is made of a rubber elastic body and elastically supports an exhaust pipe, the insulator comprising:
   a first portion that includes a formed first mounting hole, the first mounting hole engaging a vehicle body side;
   a second portion arranged separately from the first portion, the second portion including a formed second mounting hole, the second mounting hole engaging an exhaust pipe side;
   a pair of coupling portions that connects the second portion to the first portion, the pair of coupling portions including formed inner stopper surfaces, the inner stopper surfaces facing one another inwardly; and
   a first stopper surface and a second stopper surface that are respectively formed in the first portion and the second portion with a clearance to the inner stopper surfaces of the pair of the coupling portions, the first stopper surface and the second stopper surface being opposite to one another,
   wherein at least one of the first stopper surface and the second stopper surface is formed in a curved surface shape as a part of a cylindrical side surface,
   wherein the first stopper surface or the second stopper surface formed in the curved surface shape as the part of the cylindrical side surface includes a first protrusion extending parallel to an axial direction of the first stopper surface or the second stopper surface, and
   wherein the first stopper surface or the second stopper surface formed in the curved surface shape as the part of the cylindrical side surface includes a second protrusion extending perpendicular to an axial direction of the first stopper surface or the second stopper surface, the second protrusion intersecting the first protrusion.

2. The insulator according to claim 1, wherein the second protrusion intersects the first protrusion at a center of the axial direction of the first stopper surface or the second stopper surface formed in the curved surface shape as the part of the cylindrical side surface.

3. The insulator according to claim 1, wherein the second protrusion extends between terminal end portions of the first stopper surface or the second stopper surface formed in the curved surface shape as the part of the cylindrical side surface.

4. The insulator according to claim 1, wherein the second protrusion includes two tapering ends.

5. The insulator according to claim 1, wherein the first protrusion has a first protruding height,
   wherein the second protrusion extends between terminal end portions of the first stopper surface or the second stopper surface formed in the curved surface shape as the part of the cylindrical side surface,
   wherein the second protrusion has the first protruding height where the second protrusion intersects the first protrusion, and
   wherein the second protrusion tapers from the first protruding height towards the terminal end portions, the tapering starting between where the second protrusion intersects the first protrusion and a position adjacent the terminal end portions.

6. The insulator according to claim 1, wherein the first protrusion has a first protruding height,
   wherein the second protrusion extends between terminal end portions of the first stopper surface or the second stopper surface formed in the curved surface shape as the part of the cylindrical side surface, wherein the second protrusion has the first protruding height where the second protrusion intersects the first protrusion, and wherein the second protrusion tapers from the first protruding height as the second protrusion extends from where the second protrusion intersects the first protrusion to the terminal end portions.

* * * * *